United States Patent Office 3,146,770
Patented Sept. 1, 1964

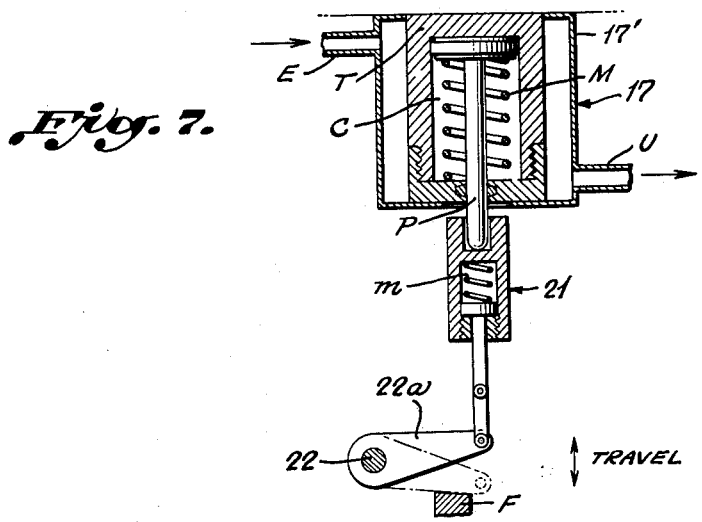
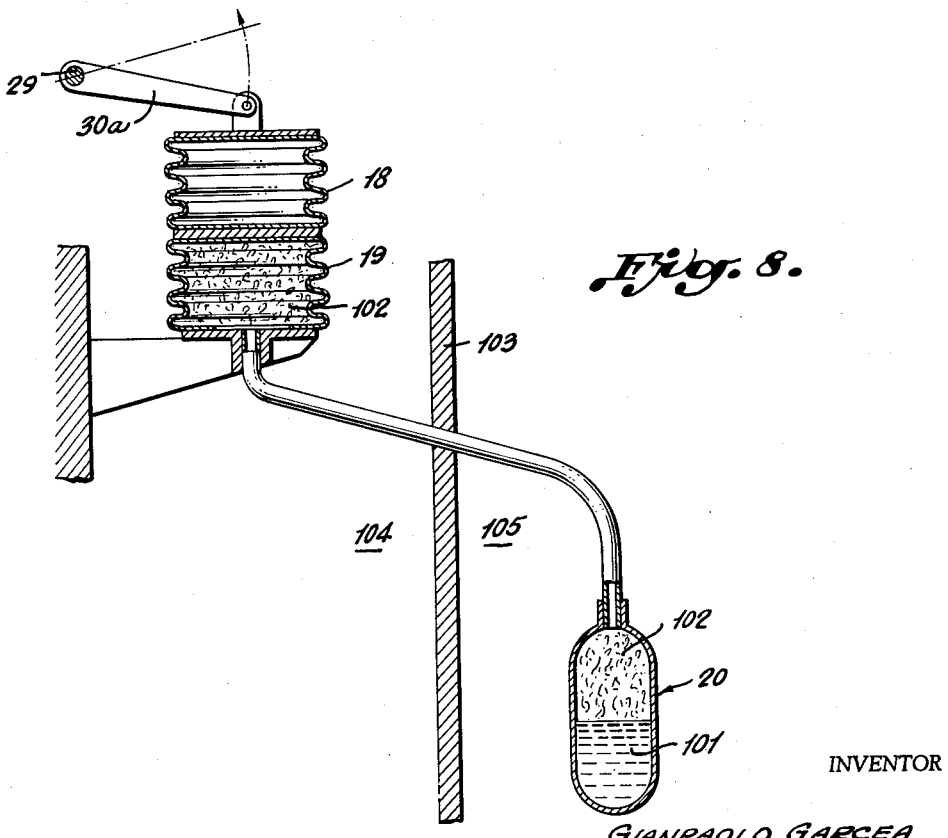

3,146,770
REGULATOR FOR INJECTION PUMPS FOR
CARBURETTOR ENGINES
Gianpaolo Garcea, Milan, Italy, assignor to Alfa Romeo
S.p.A., Milan, Italy, a company of Italy
Filed Sept. 11, 1962, Ser. No. 222,910
Claims priority, application, Italy, Oct. 10, 1959, Patent
617,597
6 Claims. (Cl. 123—140)

This invention relates to a regulator for injection pumps for carburettor engines. It is well known that the object of such a regulator is automatically to adjust the fuel exactly to the quantity required for the amount of air drawn in for any engine speed. The regulators consist of a three-dimensional cam, which acts on the injection pump regulating rod and which is moved in dependence on the throttle valve position and the engine speed. If required, the displacements of the regulating rod may be additionally influenced by correcting elements sensitive to air pressure, air temperature and engine temperature.

In the practical embodiment of such a regulator, various difficulties of a constructional nature are encountered and an object of the invention is to overcome these difficulties which relate mainly to the kinematic connection between the three-dimensional cam, the sensing lever co-operating therewith, and the injection pump regulating rod.

Moreover, the diameter of the three-dimensional cam, its longitudinal displacement and the travel produced by its profile should be as large as possible without making the dimensions of the regulator excessively large, and in order to ensure the gentlest possible movements of the sensing lever controlling the injection pump regulating bar position the three-dimensional cam profile should not have any very steep zones.

If it is remembered that in a normal carburettor engine the amount of fuel required per working cycle, particularly at operation at low speeds and with the air intake duct considerably throttled down, is very sensitive both to changes on the engine speed and to changes of position of the throttle valve, whereas the delivery of ordinary fuel injection pumps is directly proportional to the position of the regulating rod without being appreciably influenced by the speed, it will be seen that special problems are found in the low-speed range in connection with the regulator which has to adapt the pump properties to the engine requirements.

According to the present invention the three-dimensional cam controls the position of the injection pump regulating rod by means of a sensing lever and said cam is disposed with its axis parallel to the axis of a speed-indicating device and is displaceable along its axis in dependence on the engine speed and is rotatable about its axis in dependence on the throttle valve position, and there is further provided a kinematic connection between the three-dimensional cam and the speed-indicating device which includes a lever linkage which increases the value of the axial displacement of the three-dimensional cam with respect to that of the speed-indicating device, and a second lever linkage adapted kinematically to connect the said cam and a throttle valve in the engine air intake conduit, said second lever linkage being so constructed and dimensioned that when the air intake conduit is intensively throttled there is a large transmission ratio between the angle of rotation of the throttle valve and the angle of rotation of the three-dimensional cam, and this transmission ratio gradually decreases as the throttle valve opening increases.

The kinematic connection between the three-dimensional cam and the speed-indicating device preferably also contains an element which produces a variation in the increase of the value of the axial displacements of the three-dimensional cam in relation to those of the speed-indicating device in dependence on the absolute speed, in such mannner that this increase is greater in the lower speed range and decreases towards higher speed ranges.

The invention will now be further described with reference to the accompanying drawings wherein:

FIG. 7 is a fragmentary view partly in cross-section and partly in elevation of the travel limiter and thermostat; and, FIG. 8 is a fragmentary view partly in cross-section and partly in elevation of the barometer capsule, the temperature-sensitive capsule and the detection element.

Figure 1:
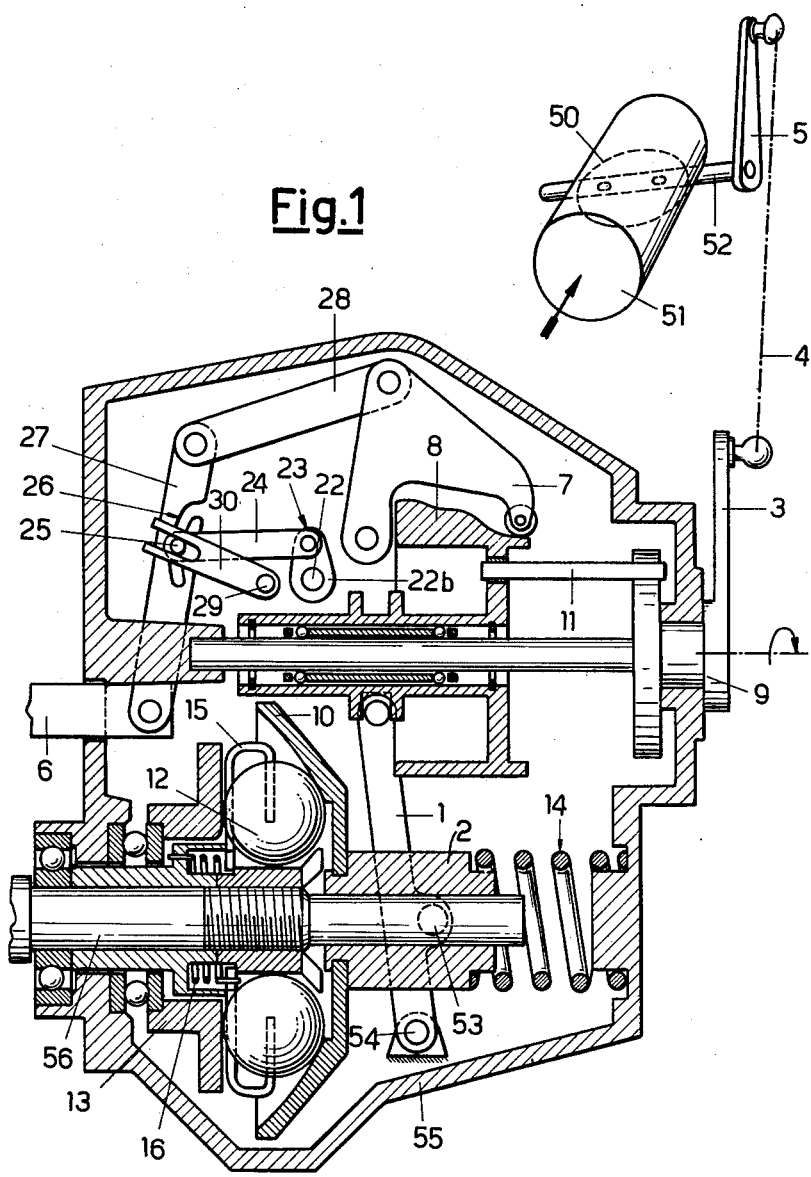
FIG. 1 is a longitudinal section through a regulator embodying the invention.
Figure 2:
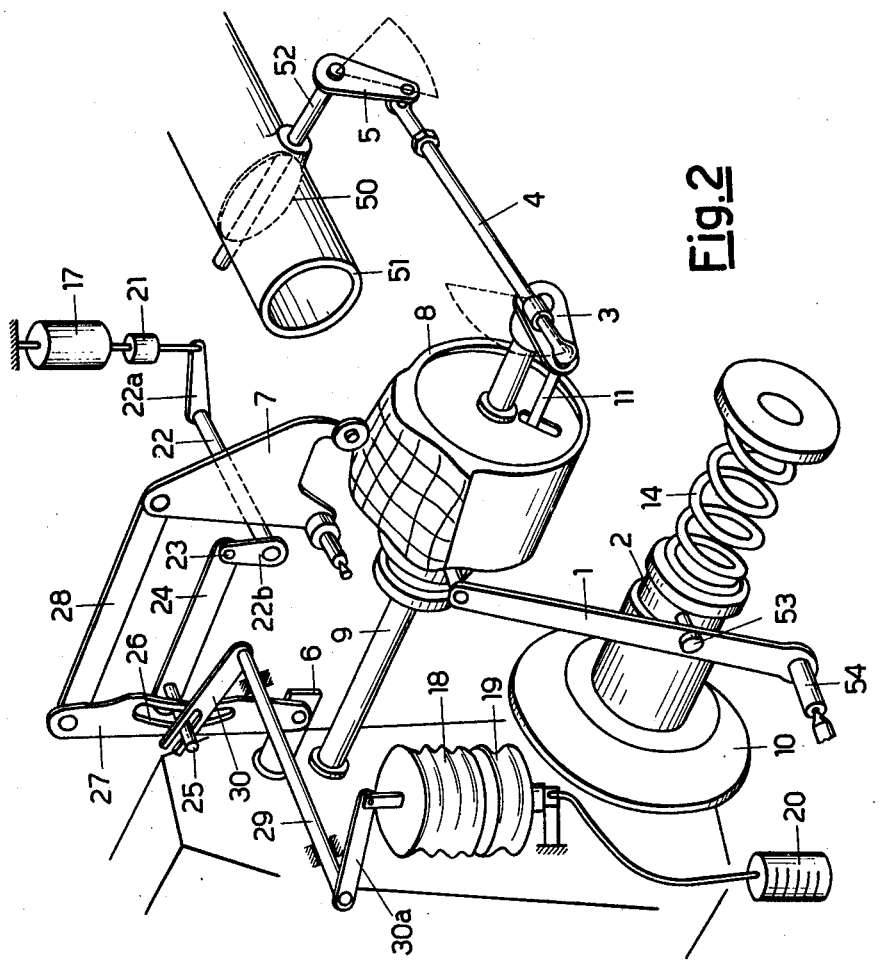
FIG. 2 is a diagrammatic perspective view of the elements of the regulator.

With reference to FIGS. 1 and 2, it will be seen that the regulator consists essentially of a three-dimensional cam 8 which is known per se and which is disposed to be freely rotatable and longitudinally slidable on a shaft 9, the axis of which is parallel to the axis of the regulating rod 6 of the injection pump (not shown) and parallel to the axis of a speed-indicating device.

A sensing lever 7 is in constant contact with the profile of the three-dimensional cam 8 and controls the regulating rod 6 by way of a lever linkage described hereinbelow. The three-dimensional cam 8 is rotated about the shaft 9 in dependence on the position of the throttle valve 50 in the air intake conduit 51 of the engine (not shown). To this end, a crank 5 is fastened to the shaft 52 carrying the throttle valve 50 and pivotally connected to said crank 5 is a rod 4 which in turn is pivotally connected to a crank 3 fastened on the shaft 9 and rotation of crank 3 is transmitted to the three-dimensional cam 8 by means of a rod 11 rigidly connected to the crank 3.

Figure 6:
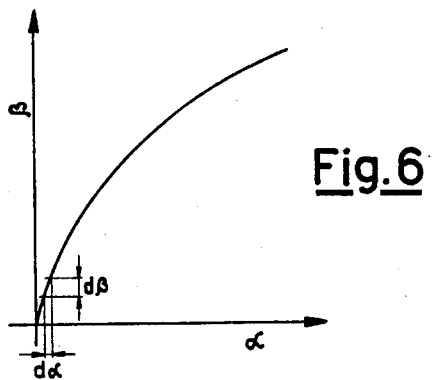
FIG. 6 is a graph showing the relationship obtained with the kinematic connection according to FIG. 5 between the angles of rotation of the throttle valve and of the three-dimensional cam.
Figure 5:
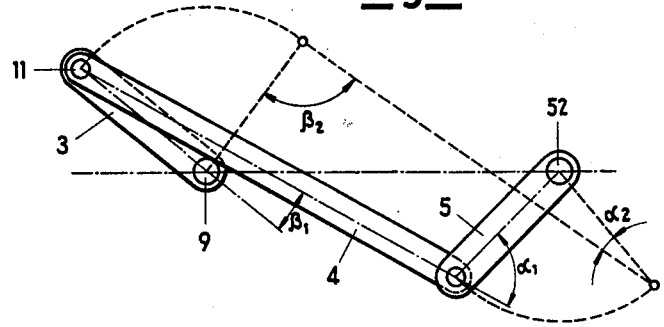
FIG. 5 shows the kinematic connection between the throttle valve spindle and the three-dimensional cam in the regulator.

FIG. 5 shows the kinematic connection between the throttle valve shaft 52 and the rod 11 acting on the three-dimensional cam 8. The solid-line position of the linkage corresponds to the position of the throttle valve 50 in which the air intake in the conduit 51 is throttled down to the greatest extent (minimum opening) while the broken-line position corresponds to the fully-open position of the throttle valve 50. The linkage is so constructed and dimensioned that when the throttle valve 50 turns out of the maximum throttling position large angles of rotation of the three-dimensional cam 8 correspond to small angles of rotation of the throttle valve, and this transmission ratio gradually decreases, the closer the throttle valve is to its fully open position. The angle between the crank 5 and the rod 4 is denoted by $\alpha$ while $\beta$ is used to denote the angle between the crank 3 and the rod 4, the sub-script "1" relating to the practically fully closed and the sub-script "2" relating to the fully open position of the throttle valve. FIG. 6 diagrammatically illustrates the relationship between the angles $\beta$ and $\alpha$ and it will be seen that at small values of $\alpha$ a variation $d\alpha$ is associated with a greater variation $d\beta$, while this increase decreases for larger values of $\alpha$.

Figure 4:
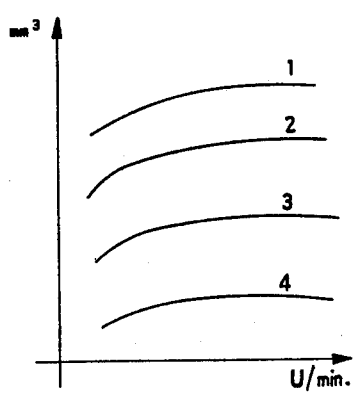
FIGS. 3 and 4 are graphs of the fuel requirements of a carburettor engine and the quantity of fuel delivered by an injection pump.
Figure 3:
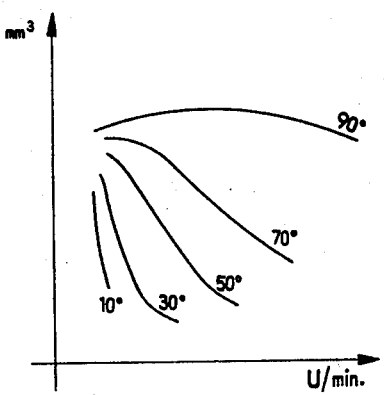

The value of this arrangement will be clear from a study of FIGS. 3 and 4. FIG. 3 shows the quantity of fuel delivered by the injection pump per cycle in cubic millimetres in dependence on the engine speed (in r.p.m.) and in dependence on the position of the throttle valve (opening angle 10°, 30°, 50°, 70° and 90°=full opening). It will be seen that at low speeds and with the air intake throttled down intensively the quantity of fuel is very sensitive both with regard to engine variations and variations in the position of the throttle valve.

FIG. 4, on the other hand, illustrates the properties of a normal injection pump, i.e. the quantity of fuel delivered in cubic milli-metres per pump stroke against the engine speed (in r.p.m.) for different positions (1, 2 . . . 4) of the pump regulating rod, and it will be seen that the delivery varies practically only very little with the engine speed.

Since the regulator has to adapt the injection pump properties to the engine requirements, it will be seen that special problems arise for the regulator particularly in the low-speed region.

These problems are solved firstly by the said kinematic connection between the throttle valve and the three-dimensional cam, and secondly the axial displacements of the three-dimensional cam on a change of engine speed must be as large as possible in order to keep the cam profile as smooth as possible.

This latter requirement is satisfied according to the invention by disposing the three-dimensional cam on the separate shaft 9 parallel to the axis of a speed-indicating device, and by connecting the two devices by means of a linkage which increases the value of the axial displacements of the three-dimensional cam 8 with respect to those of the indicating element of the speed-indicating device, so that the dimensions of the latter are kept small and the displacements of the said elements can also be small.

The slidable element of the speed-indicating device is constructed in the form of a bell 10, to the hub 2 of which a lever 1 is pivotally connected at a point 53 situated between the one end of the lever which is pivoted at 54 on a housing 55 of the regulator and the other end of the lever 1 which is operatively connected to the hub of the three-dimensional cam 8.

The speed-indicating device is constructed in a manner known per se as a centrifugal governor and comprises a number of balls 12 which are disposed around the shaft 56 of the device and which on the one hand bear against a flat disc 13 rigidly connected to the shaft 56 and on the other hand against the inside of the bell 10, which is urged towards the disc 13 by a spiral spring 14. The balls 12 are rotated by a driver 15, connected by a spring element 16 to the shaft 56, to avoid any direct action on the group of balls by shaft impacts. To render the indicating device extremely sensitive to low speeds, the inside profile of the bell 10, with which the balls 12 cooperate, is curved and not merely conical. The inside profile is so selected that at low speeds a small displacement of the bell 10 is associated with considerable displacements of the three-dimensional cam 8 while in the high speed ranges a large speed increase is associated with a small axial displacement of the three-dimensional cam, the centrifugal force of the balls 12 and the force of the spring 14 providing counteracting forces.

The regulator according to the improvement is also provided with correcting elements sensitive to air pressure, air temperature and engine temperature.

These elements, which are combined in a very simple and advantageous manner, consist of a thermostat 17 (FIG. 2) which is sensitive to the engine temperature, and a barometer capsule 18 connected to a temperature-sensitive capsule 19 which is in turn controlled by an element 20 which detects the temperature of the outside air.

The thermostat 17 includes a cylinder 17' and conduits E and U denote the inlet and outlet, respectively, of the engine cooling medium (i.e. water) in the jacket. A container T mounted within the cylinder 17' is provided with space S in which piston P is positioned. C illustrates, for example, wax or a wax-type organic compound which, for mere thermal effect or for allotropic modification, expands remarkably when the temperature passes from a value (i.e. 40° C.) to a higher value (i.e. 70° C.). A spring M operably associated with the piston P serves to return the piston to its end of stroke internally of the container T.

The thermostat acts through a travel limiter 21 upon a lever 22a mounted on one end of a rotatable shaft 22 the other end of which carries a second lever 22b pivotally connected to a lever 24 by a pin 23. The free end of the lever 24 carries a pin 25 engaging with an arcuate slot 26 in a lever 27 pivotally connected at one end to the regulating rod 6 and at its other end to a connecting link 28 leading to the sensing lever 7. The pin 25 thus acts as the pivot point for the double lever 27.

Since the stresses of a thermal element responsive to temperature of the type indicated are very high, it if the piston stroke in function of temperature is hindered, the travel limiter 21, into which a pre-loaded spring $m$ can transmit without yielding all of those loads which are necessary for swinging the lever 22a, is located between the thermostat 17 and the lever 22a. This is for limiting the stroke of the lever 22a in correspondence to a limit stop F. When the lever 22a reaches the stop F, the spring $m$ yields and thus the loads do not reach too high values. Manifestly, the thermal element responsive to temperature can be different from that described, such as vapor pressure can be substituted for the wax. In some instances, the travel limiter 21 would not be necessary since the loads in correspondence to a limit stop could not increase excessively.

The pin 25 also is subjected to the action of the forked end of a lever 30 mounted on a rotatable shaft 29 the other end of which carries a lever 30a connected to the indicator element of the barometer capsule 18.

As shown in FIG. 8, the element 20 which can be a cylinder contains an evaporating liquid 101, the vapor pressure of which is a function of the ambient temperature. The vapor 102 passes from the upper part of the cylinder 20 via a conduit into the capsule 19. A wall 103 separates the engine ambient zone 104 from the zone of external ambient air 105.

The position of the pin 25 and hence the pivot point for the lever 27 actuating the regulating rod 6 is thus adjusted both by the thermostat 17 and by the capsules 18, 19, so that the desired correction is made.

To ensure that the delivery of the injection pump is adapted to the quantity of air drawn in in all ranges of operation, the slot 26 in the lever 27 should have an arcuate shape, the centre of curvature of which coincides with the axis of the pin 23 when the lever 27 is in the zero delivery position.

The levers 22b and 24 are advantageously so designed as to enclose an angle of about 90° in normal operation.

This application is a continuation-in-part of the application Serial No. 60,068, filed October 3, 1960, now abandoned.

What I claim is:

1. A regulator for a carburetor engine injection pump, comprising a three-dimensional cam, a regulating rod for the pump, an air intake conduit, a throttle valve in said conduit, said cam acting on the regulating rod and being adjustable in dependence on the throttle valve position and the speed, a sensing lever cooperable with said cam and regulating rod whereby said cam controls the position of said regulating rod, a speed indicating device, said cam having its axis parallel to the axis of said speed-indicating device and being displaceable along its axis in dependence on the engine speed and being rotatable about its axis in dependence on the position of the throttle valve, a kinematic connection between the cam and the speed indicating device including a lever linkage for increasing the value of the axial displacement of said cam with respect to that of the speed-indicating device, and a second lever linkage for kinematically connecting said cam and said throttle valve, and said second lever linkage being so constructed and dimensioned that when the throttle valve turns out of the maximum throttling position, large angles of rotation of the cam correspond to small angles of rotation of the throttle valve and with this transmission ratio gradually decreasing the closer the throttle valve is to its fully open position.

2. The regulator according to claim 1, wherein the kinematic connection between the three-dimensional cam and the speed-indicating device includes means for producing a variation in the increase of the value of the axial displacements of the three-dimensional cam with respect to those of the speed-indicating device in dependence on the absolute engine speed, in such manner that this increase in value is greater in the lower speed range and decreases towards higher speed ranges.

3. The regulator according to claim 1, wherein the speed-indicating device is a centrifugal governor, and comprises a rotating shaft, a number of balls disposed around said rotating shaft, resilient driving means cooperable with said balls to rotate said balls with the shaft, a disc rigidly connected to the shaft, a hollow bell, spring means urging said bell towards said disc, said balls bearing against said disc and the inside of said hollow bell, respectively, and which as the rotational speed varies, moves along the shaft axially, a lever connecting said bell to said three-dimensional cam, the lever being pivotally connected at one end to a fixed point, at the other end to said cam and at an intermediate point to the bell.

4. The regulator according to claim 3, wherein the hollow bell has a curved inside profile.

5. The regulator according to claim 1, in which said sensing lever bears against said cam, an actuating lever connected to said regulating rod, a connecting link interconnecting said sensing and actuating levers, a central pivot pin, said actuating lever having an arcuate slot therein in which said central pivot pin is located and about which pin said actuating lever is pivoted, thermostat means sensitive to engine temperature, means connecting the thermostat means to said pivot pin, pressure sensitive means, and means connecting the pressure sensitive means to said pivot pin with said thermostat means and pressure sensitive means being operative for adjusting the position of the pin in the arcuate slot dependent upon engine temperature and pressure conditions.

6. The regulator according to claim 5, including a further pivoted lever, with one end of said further lever carrying said central pivot pin and the centre of curvature of the arcuate slot coincides with the pivoted axis of said further pivoted lever when the actuating lever is in the zero delivery position.

References Cited in the file of this patent

FOREIGN PATENTS

| | | |
|---|---|---|
| 811,904 | Great Britain | Apr. 15, 1959 |
| 1,202,171 | France | July 20, 1959 |